(12) United States Patent
Webb et al.

(10) Patent No.: US 8,312,423 B1
(45) Date of Patent: Nov. 13, 2012

(54) DEPLOYING AND DISTRIBUTING OF APPLICATIONS AND SOFTWARE COMPONENTS

(75) Inventors: Peter Hartwell Webb, Newton, MA (US); John Micco, Waltham, MA (US); Charles Gary Nylander, Merrimack, NH (US)

(73) Assignee: The MathWorks, Inc., Natick, MA (US)

( * ) Notice: Subject to any disclaimer, the term of this patent is extended or adjusted under 35 U.S.C. 154(b) by 1258 days.

(21) Appl. No.: 11/880,288

(22) Filed: Jul. 20, 2007

Related U.S. Application Data

(63) Continuation of application No. 10/932,512, filed on Sep. 1, 2004, now Pat. No. 7,685,596.

(51) Int. Cl.
*G06F 9/44* (2006.01)
(52) U.S. Cl. .......................... 717/106; 717/172; 717/177
(58) Field of Classification Search .......... 717/106–109, 717/127–133, 168–178
See application file for complete search history.

(56) References Cited

U.S. PATENT DOCUMENTS 6,587,842 B1   7/2003   Watts

OTHER PUBLICATIONS

S.E. Hobbs, "Project ReSeDA—Remote Sensing Data Assimilation", 2000, Contribution of Cranfield University, UK, pp. 1-28.*
Walter, "Programming a Virtual System", 2001, Part 1-3, http://www.flipcode.com/archives/programming , 21 pages.*
Rabaiotti, "Implementing an RSA Cryptography System for Windows®", Jun. 2003, Student report, Department of Computer Science, Cardiff University, UK, 67 pages.*
Book Industry Book Group, "The Electronic Book Exchange System (EBX), Version 0.8," Glassbrook, Inc., pp. 1-109 (2000).

* cited by examiner

*Primary Examiner* — Ted T Vo
(74) *Attorney, Agent, or Firm* — Nelson Mullins Riley & Scarborough LLP

(57) ABSTRACT

A self-contained virtual file system is disclosed for deploying and distributing an application and/or software component. Executable files relating to the application are included in a distributable composite file. The composite file and a user front end application are deployed and distributed to an application user where the application is executed. An application provider can tag the composite file with the version information and other useful meta-data of the files for the application. The format of the composite file may support the storage of any kind of file types and associated meta-data. The composite file may contain the hierarchical directory structure of the files for the application so that the hierarchical directory structure is installed in the application user's electronic device.

28 Claims, 8 Drawing Sheets

DEPLOYING AND DISTRIBUTING OF APPLICATIONS AND SOFTWARE COMPONENTS

RELATED APPLICATIONS

The present application claims the benefit under 35 U.S.C. §120 and is a continuation of U.S. application Ser. No. 10/932,512, filed Sep. 1, 2004 which is hereby incorporated herein by reference in its entirety.

FIELD OF THE INVENTION

The present invention relates generally to applications and software components and more particularly to methods and systems for deploying and distributing the applications and software components.

BACKGROUND OF THE INVENTION

Applications and software components generally include a collection of executable files that perform their own functions. For example, an application generated in MATLAB®, from The MathWorks, Inc. of Natick, Mass., which provides a technical computing environment, may contain executable files, such as M-files, MEX-files, Dynamically Linked Libraries (DLLs), Java files, etc. If the application consists of a large number (e.g., hundreds or more) of executable files, deploying and distributing all of the files individually to an application user may create problems in the version control and file management of the application. In particular, the provider of the MATLAB®—based application may not modify some of the executable files in the application, such as DLLs and Java files, and add version information to the executable files. Thus, versioning each of the executable files individually is impractical. Also, storing each of the executable files individually in an application user's file system forces the application user to manage the files individually rather than being able to treat the collection of executable files as a single unit. In addition, the provider may wish to hide or conceal the contents of human readable executable files (M-files, in particular) and most conventional deployment technologies do not employ strong encryption.

SUMMARY OF THE INVENTION

The present invention provides a self-contained virtual file system for deploying and distributing applications and/or software components, and a mechanism for generating this file system. The self-contained virtual file system includes a distributable composite file that may contain executable files relating to an application. The composite file is deployed and distributed to an application user and executed in the environment of the application user. The format of the composite file is controlled by an application provider so that the application provider can tag the composite file with the version information of the application and other useful metadata of the executable files in the composite file. The format of the composite file may support the storage of any kind of file types and associated meta-data. The composite file may contain a hierarchical directory structure of the files and folders for the application so that the hierarchical directory structure is installed in the application user's electronic device.

At the execution of the application, the executable files that may or may not be encrypted in the composite file are made available to an execution engine so that the execution engine may load and execute the executable files in the composite file. The extension of the composite file may be registered with the operating system of the application user so that execution of the application may begin automatically when the application user clicks on the composite file. The composite file may include an operating system specific header on the front of the composite file which exposes functional entry points that redirect execution to the content of the composite file.

In accordance with one aspect of the present invention, a method is provided for deploying and distributing an application to an application user using an application development tool. A composite file is generated for including one or more input executable files for the application and other executable files that contain functions on which the input executable files depend. The composite file may contain data files as well as the executable files. The composite file is deployed and distributed to the application user so that an execution engine executes the executable files contained in the composite file to run the application in an application user's electronic device.

In another aspect of the present invention, a method is provided for distributing and deploying an application to an application user. A composite file that contains input executable files for the application and other executable files containing functions on which the input executable files depend, is received and installed in a directory in an application user's electronic device. The composite file may contain data files as well as the executable files. The executable files in the composite file are compressed and encrypted for protecting content from unauthorized disclosure. At execution, the executable files are decrypted and uncompressed for an execution engine to execute the executable files and run the application in the application user's electronic device.

In still another aspect of the present invention, a system is provided for deploying and distributing an application to an application user. The system includes an application development tool for receiving one or more input executable files for the application and generating a composite file that contains the input executable files and other executable files containing functions on which the input executable files depend. The composite file may contain data files as well as the executable files. The system also includes an execution engine for executing the executable files in the composite file. The composite file is deployed and distributed to the application user so that the execution engine executes the executable files in the composite file to run the application in an application user's electronic device.

In yet still another aspect of the present invention, a medium is provided that holds a composite file for deploying and distributing an application to an application user. The composite file includes input executable files for the application. The composite file also includes other executable files containing functions on which the input executable files depend. The composite file may also contain data files as well as the executable files. The composite file is deployed and distributed to the application user so that an execution engine executes the executable files contained in the composite file to run the application in an application user's electronic device.

By providing a distributable composite file, a heterogeneous file container, that contains executable files relating to an application and/or software component, the present invention provides a useful tool for deploying and distributing the application to an application user. The composite file may also contain data files as well as the executable files. The present invention enables users to add their own files to the composite file. In the present invention, some of the executable files in the composite file may be encrypted for security purposes. In particular, by tagging the composite file with version information of the application, the present invention enables an application provider to easily control the version of the application. The version information allows execution engines to determine which content they can run. Also, by tagging the identification of those who compiled the application, the present invention helps track pirated applications. In addition, by installing the composite file that includes all of the files relating to the application, the present invention enables the application user to manage the application as a single unit. The present invention also enables the management of demo license via date. In general, the present invention enables exporting license management policies without the requirement of exporting a specific license management application.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
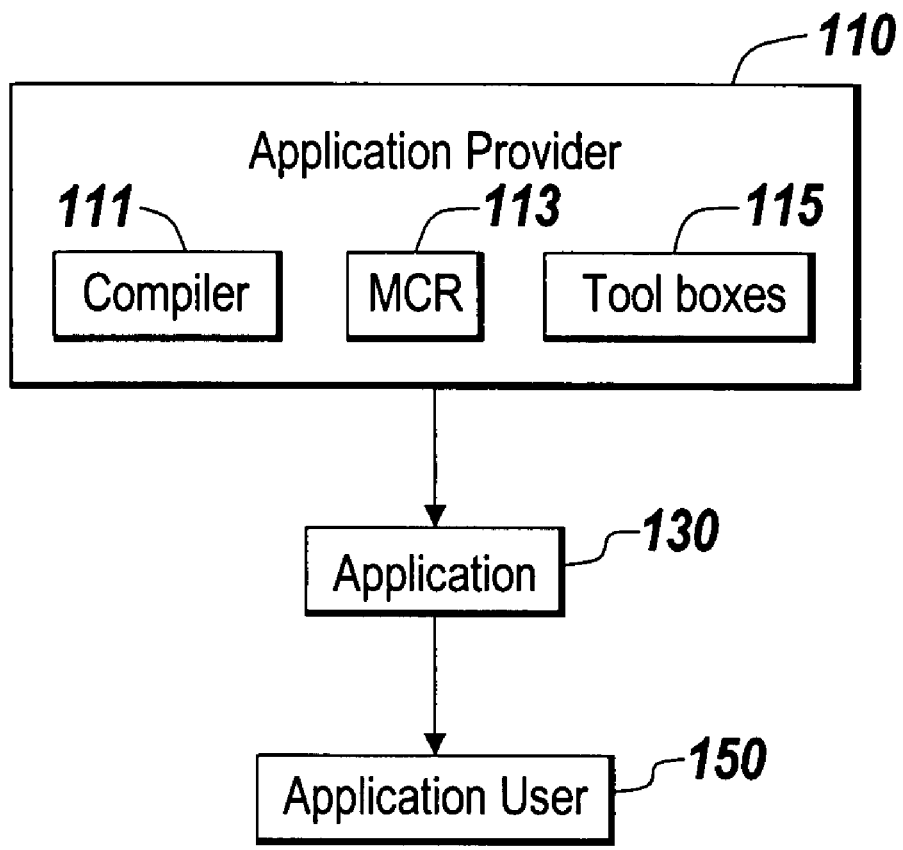
FIG. 1 is a block diagram showing that an application provider deploys and distributes an application to an application user in the illustrative embodiment of the present invention.

The illustrative embodiment of the present invention concerns deploying and distributing of applications and/or software components. The "applications" represent a complete, self-contained program that performs a specific function directly for a user. The "software components" are generally used to represent a unit of composition with contractually specified interfaces and explicit context dependencies. In the description set forth below, the "applications" are comprehensively used to include the "software components."

The illustrative embodiment will be described solely for illustrative purposes relative to a MATLAB® environment. Although the illustrative embodiment will be described relative to MATLAB®-based applications, one of ordinary skill in the art will appreciate that the present invention may be applied to deploy and distribute applications generated in different programming and development environments, such as Labview from National Instruments, Inc.

MATLAB® is an intuitive high performance language and technical computing environment. MATLAB® provides mathematical and graphical tools for data analysis, visualization and application development. MATLAB® integrates computation and programming in an easy-to-use environment where problems and solutions are expressed in familiar mathematical notation. MATLAB® is an interactive system whose basic data element is an array that does not require dimensioning. This allows users to solve many technical computing problems, especially those with matrix and vector formulations, in a fraction of the time it would take to write a program in a scalar non-interactive language, such as C and FORTRAN. MATLAB® provides application development tools including the MATLAB® Compiler. MATLAB® COM Builder and MATLAB® Excel Builder work in conjunction with the MATLAB® Compiler to automatically generate software components suitable for execution in COM and Excel environments, respectively. The application development tools enable users to create and distribute MATLAB® applications and share MATLAB® work with colleagues who may use MATLAB® or other environments. It may also allow for deployment and distribution of MATLAB® based applications for commercial sale.

In the illustrative embodiment of the present invention, the MATLAB® Compiler generates an archive that includes all of the files relating to an application. The archive is deployed and distributed to application users so that the application users can execute the application in their environments. The archive may include various types of files for the application, such as executable files in a binary format and executable files in a source code format. The archive may also include other types of files needed for the application, for example, but not limited to non-executable text files. The archive includes version information of the application as well as other metadata of the files included in the archive. Some of the files in the archive, e.g., the executable files in a source code format, may be encrypted using an encryption key for security purposes. The encryption key may also be encrypted with another key and included in the archive so that the application users who receive the archive can decrypt the files to execute the application.

FIG. 1 is a block diagram showing that an application provider 110 deploys and distributes an application 130 to an application user 150. The application provider 110 includes a MATLAB® environment in the illustrative embodiment of the present invention. One of skill in the art will appreciate that the MATLAB® environment is illustrative and application providers may deploy and distribute applications to application users using other programming or development environments. In the illustrative embodiment, the application provider 110 may include MATLAB® Compiler ("Compiler") 111, MATLAB® Component Runtime ("MCR") 113 and MATLAB® Toolboxes ("Toolboxes) 115. By using the Compiler 111, the application provider 110 generates a distributable archive 330 (see FIG. 3) and distributes the archive to the application user 150. The distributable archive contains all of the related files to the application 130 that may include executables as well as non-executables. The Compiler 111 will be described below in more detail with reference to FIGS. 3 and 4.

The application provider 110 may deploy and distribute the application 130 with the MCR 113 so that the application 130 is executed by the MCR 113 in the electronic device 200 (see FIG. 2) of the application user 150. If the MCR 113 is available to the application user 150 separately, the MCR 113 may not be deployed and distributed with the application 130. The MCR 113 is an execution engine that enables the application 130 to be executed in the electronic device of the application user 150. The application user 150 may or may not include a MATLAB® environment. The application 130 may be executed in any environments, such as Window environments and UNIX environments. The application 130 may not be executed in the MATLAB® environment after being compiled. By preventing the application 130 from being executed in or modified by MATLAB®, the application provider 110 may have greater control of how the application 130 is used and shared. The Compiler 111 generates an application 130 of the appropriate executable type depending on the execution environment of the application user 150. The Compiler 111 and the MCR 113 include built-in public and private keys, respectively, to encrypt and decrypt data relating to the application 130. This will be described below in more detail with reference to FIGS. 5 and 9.

The Toolboxes 115 are comprehensive collections of MATLAB® functions on which the application 130 may depend. The Toolboxes 115 support applications involving signal and image processing, control system design, optimization, financial engineering, symbolic math, neural networks, and others. The Toolboxes 115 may be built with M-files, MEX files, Java files and other application development languages. M-files are written in a MATLAB® language and executed in the MATLAB® environment. MEX-files are dynamically linked subroutines produced from C or FORTRAN source code that, when compiled, can be run from within MATLAB® in the same way as MATLAB® M-files or built-in functions. One of skill in the art will appreciate that the MATLAB® functions provided in the Toolboxes 115 may be built using other executable content, such as COM components, ActiveX components and Java functions.

Figure 2:
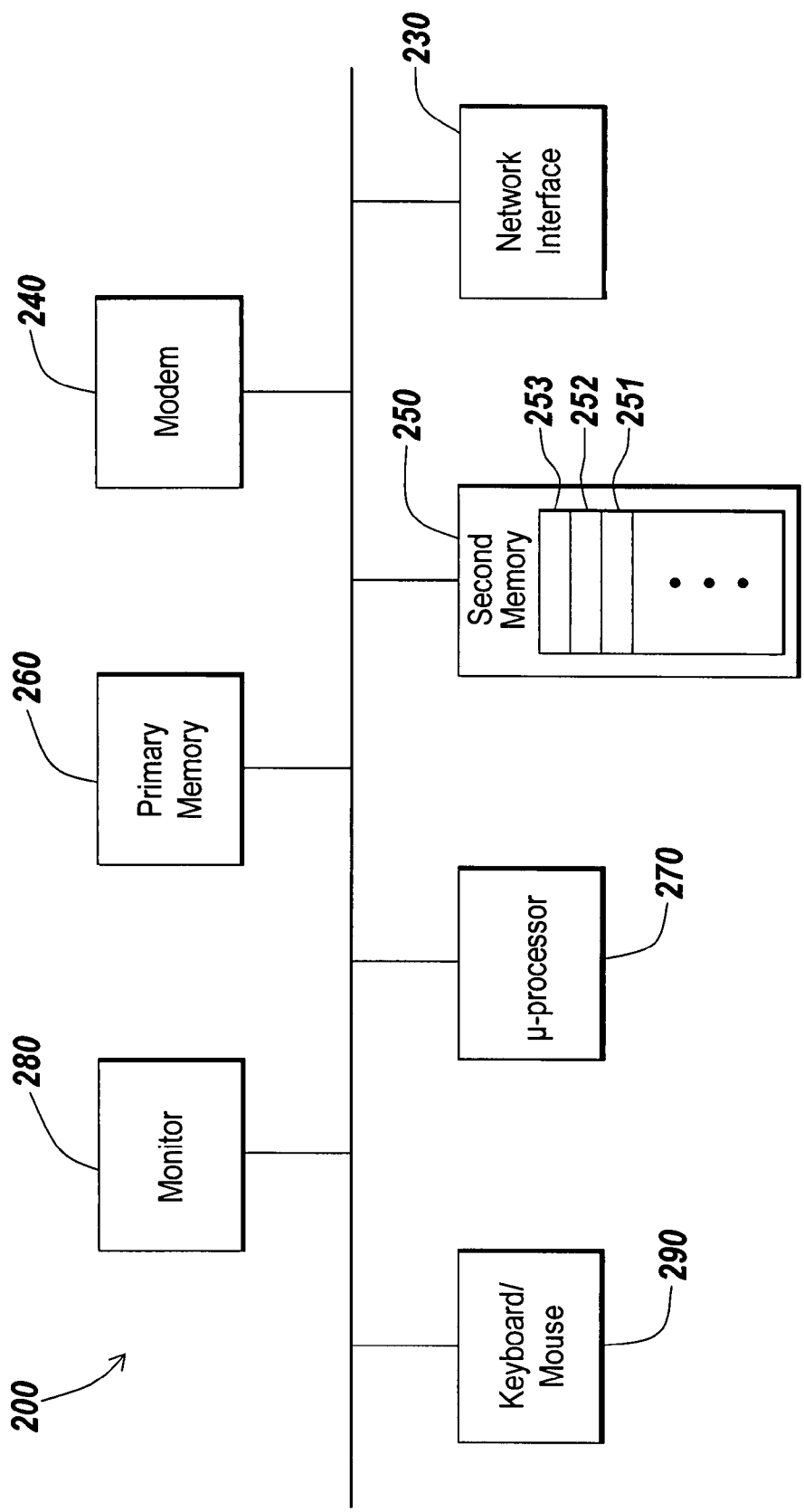
FIG. 2 is an exemplary electronic device suitable for practicing the illustrative embodiment of the present invention depicted in FIG. 1.

FIG. 2 is an exemplary electronic device 200 suitable for practicing the illustrative embodiment of the present invention. The application provider 110 and/or application user 150 may include the electronic device 200. One of ordinary skill in the art will appreciate that the electronic device 200 is intended to be illustrative and not limiting of the present invention. The electronic device 200 may take any forms, including but not limited to a workstation, server, network computer, Internet appliance, mobile device, a pager, a tablet computer, and the like.

The electronic device 200 includes a network interface 230, a MODEM 240, a secondary memory 250, a primary memory 260, a microprocessor 270, a monitor 280 and a keyboard/mouse 290. The microprocessor 270 controls each component of the electronic device 200 to run software tools for the MATLAB® environment properly. The electronic device 200 receives input commands necessary for deploying and distributing the application 130 to the application user 150, such as the names of the executable files for the application 130, through the keyboard/mouse 290. The electronic device 200 displays in the monitor 280 the commands the application provider 110 enters and the result that the electronic device 200 produces in response to the commands. The primary memory 260 fetches from the secondary memory 250 and provides to the microprocessor 270 the codes that need to be accessed by the microprocessor 270 to operate the electronic device 200 and to run the MATLAB® environment. The secondary memory 250 usually contains software tools for applications. The secondary memory 250 includes, in particular, code 251 for the Compiler 111, code 252 for the MCR 113, and code 230 for the Toolboxes 115.

One of ordinary skill in the art will appreciate that the application provider 110 and the application user 150 may be connected through communication networks using the MODEM 240 and network interface 230 so that the application user 150 can download the application 130 from the application provider 110. The network interface 230 and the MODEM 240 enable the electronic device 200 to communicate with other electronic devices through communication networks, such as Internet, intranet, LAN (Local Area Network), WAN (Wide Area Network) and MAN (Metropolitan Area Network). The communication facilities may provide support for the distributed implementations of the present invention.

Figure 3:
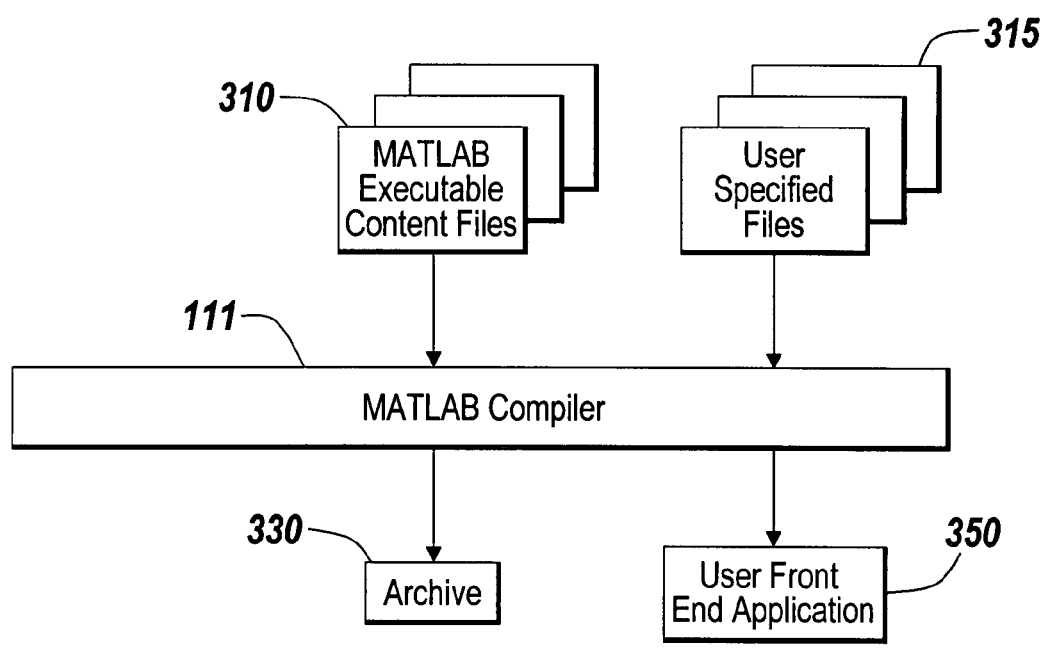
FIG. 3 is an exemplary block diagram illustrating input and output files of MATLAB® Compiler depicted in FIG. 1.

FIG. 3 is an exemplary block diagram illustrating the input and output files of Compiler 111 in the illustrative embodiment of the present invention. The Compiler 111 takes MATLAB® executable content files 310, such as M-files, MEX-files, Java files, etc., as input files for the application 130. The input MATLAB® executable content files 310 may depend on other MATLAB® functions provided in the Toolboxes 115 to perform a desired function of the application 130. The application provider 110 may designate the input MATLAB® executable content files 310 at a command line that invokes the Compiler 111.

The Compiler 111 may also take user specified files 315 that may contain executable content and/or data content, as input files for the application 130. The application provider 110 may add to the archive 330 text or data files for the application 130 by using an option for specifying files that should be included in the archive 330 directly. If the application 130 makes use of platform-specific binary code format files, such as MEX-files that can be executed in MATLAB® environments, the application provider 110 may also add to the archive 330 the platform-specific binary code format files by using the option for adding files to the archive 330 directly. Some M-files and MEX files may be discovered automatically by a dependency analyzer (410 in FIG. 4). On receiving the input files 310 and 315, the Compiler 111 generates an archive 330 containing the input files 310 and 315 that the application provider 110 designates and other MATLAB® executable content files on which the input MATLAB® executable content files 310 may depend on. The archive 330 will be described below in more detail with reference to FIGS. 4 and 5.

The archive 330 is independent of the final executable types of the application 130. In order to adapt the archive 330 to the final executable type of the application 130, the Compiler 111 takes the input MATLAB® executable content files 310 and produces a user front end application 350 that includes code for wrapper functions for the final executable type of the application 130. The wrapper functions interface the MATLAB® executable content files in the archive 330 with the final executable type of the application 130. The final executable types of the application 130 may include a stand alone executable and a shared library. The stand-alone executable and the shared library can run independently of a MATLAB® environment. The shared library may include dynamically linked libraries (DLLs) on Microsoft Windows. These executable types are illustrative and not limiting the scope of the present invention. One of skill in the art will appreciate that the present invention may be applied to other types of executables, such as C++ static libraries, Visual Basic application files that can be imported into Excel as a stand alone function, and Component Object Model (COM) components that can be used in any application that works with COM objects.

Figure 4:
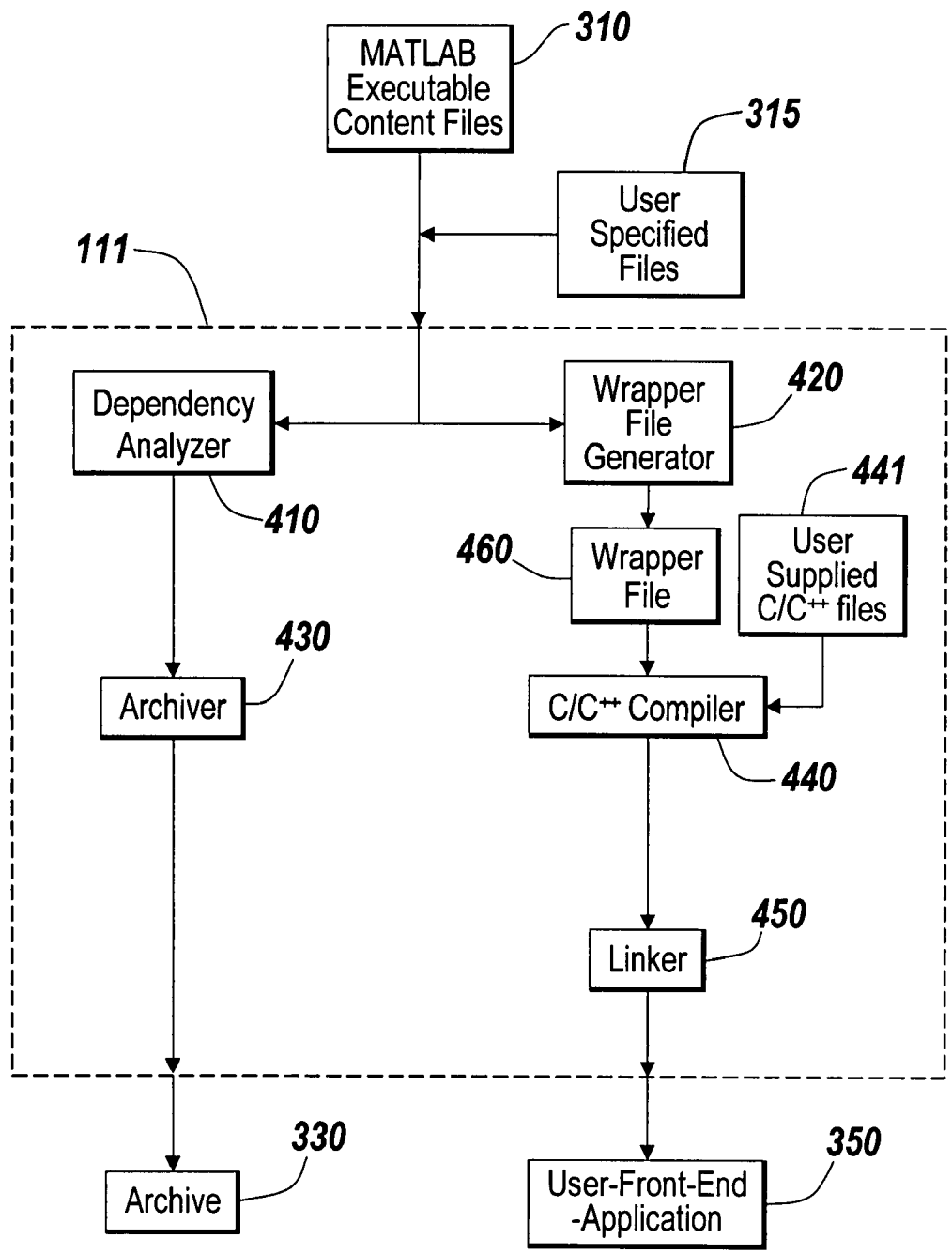
FIG. 4 is a detailed block diagram of the MATLAB® Compiler depicted in FIGS. 1 and 3.

FIG. 4 is a detailed block diagram of Compiler 111 depicted in FIGS. 1 and 3. The Compiler 111 may include a dependency analyzer 410, a wrapper file generator 420, an archiver 430, a C/C++ compiler 440 and a linker 450. The C/C++ compiler 440 and the linker 450 are tools used by the Compiler 111 to perform its function and may be provided by third party vendors. Users may choose which C/C++ compiler and linker to use. The dependency analyzer 410 determines the MATLAB® functions on which the input MATLAB® executable content files 310 depend and generates a list of MATLAB® executable content files. This list may include the MATLAB® executable content files called by the input MATLAB® executable content files 310 as well as the MATLAB® executable content files that the called MATLAB® executable content files 310 call, and so on. The wrapper file generator 420 generates a wrapper file based on the final executable type of the application 130, such as a stand-alone executable and a shared library. The wrapper file contains a required interface between the MATLAB executable content files in the archive 330 and the executable type of the application 130. The wrapper file 460 may differ depending on the execution type generated by the Compiler 111. For example, the wrapper file for the stand alone executable contains the main function that takes the input arguments that are passed on the command line and passes the input arguments to the input MATLAB® executable content files 310. The wrapper file for a shared library contains the entry points for each public MATLAB® executable content file function.

The wrapper file generator 420 also generates a component data file that contains information needed for the MCR 113 to execute the MATLAB executable content files in the archive 330 at run time. The component data file contains data for initializing the MCR 113 in the electronic device 200 of the application user 150. The component data file also includes path information of the MATLAB executable content files for the MCR 113 to load the MATLAB executable content files in the archive 330 as well as cryptographic keys used to decrypt some of the MATLAB executable content files in the archive 330.

Based on the list of MATLAB executable content files generated by the dependency analyzer 410, the archiver 430 creates the archive 330 that contains the MATLAB executable content files needed by the application 130 to properly execute at run time. Some of the MATLAB executable content files in the archive 330 are compressed and encrypted using keys generated by the Compiler 111. The illustrative embodiment of the present invention uses a variant of the Advanced Encryption Standard (AES) cryptosystem in which both symmetric and non-symmetric keys are used to encrypt the MATLAB® executable content files. One of skill in the art will appreciate that the MATLAB® executable content files may be encrypted using other symmetric-key encryption standards, such as Data Encryption Standard (DES), or other types of encryption algorithms. The symmetric key is also encrypted using a public key, which is built in the Compiler 111, and included in the archive 330. The archive 330 includes information on the directory structure of the MATLAB® executable content files so that the MATLAB® executable content files are properly installed by the application user 150. The archive 330 will be described below in more detail with references to FIGS. 5A and 5B.

The wrapper file and component data file generated by the wrapper file generator 410 include C/C++ code in the illustrative embodiment of the present invention. The generated C/C++ code is compiled into object code in the C/C++ compiler 440. The C/C++ compiler 440 may also compile C/C++ files 441 supplied on the command line by the application provider 110. The linker 450 links the generated object code with the necessary MATLAB® libraries to create the user front end application 350. One of skill in the art will appreciate that the wrapper file and component data file may include other types of code, such as Java, C# and Visual Basic, and be compiled and linked using a corresponding compiler and linker provided by appropriate vendors.

Figure 5A:
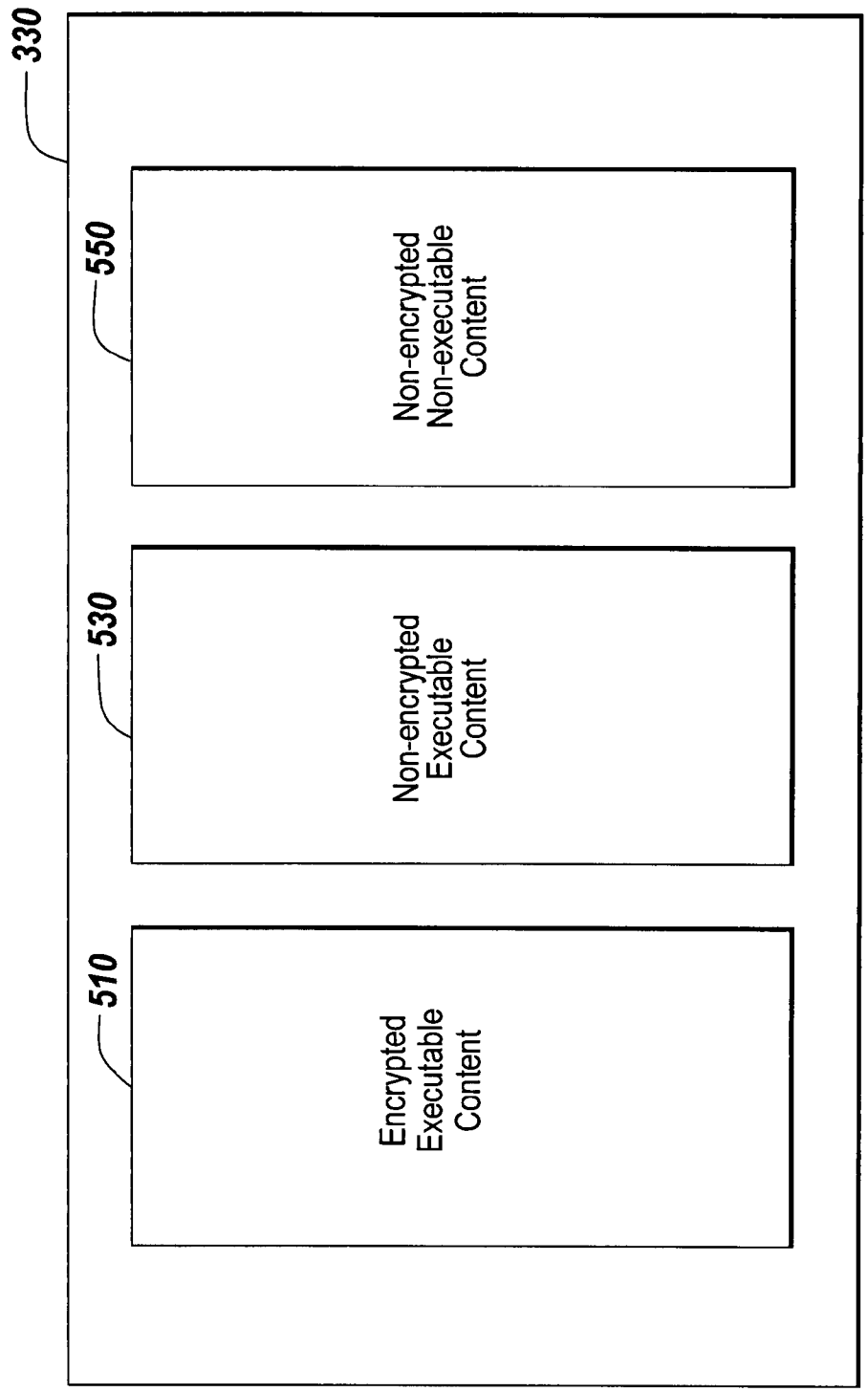
FIG. 5A depicts an exemplary format of the archive generated by the MATLAB® Compiler in the illustrative embodiment of the present invention.

FIG. 5A depicts an exemplary format of the archive 330 generated by the Compiler 111 in the illustrative embodiment of the present invention. The archive 330 has a format that can contain any type of files including executable and non-executable files, and encrypted and non-encrypted files. In the illustrative embodiment, the archive 330 has a ZIP file format that can include different types of content, such as encrypted executable content 510, non-encrypted executable content 530 and non-encrypted non-executable content 550.

Figure 5B:
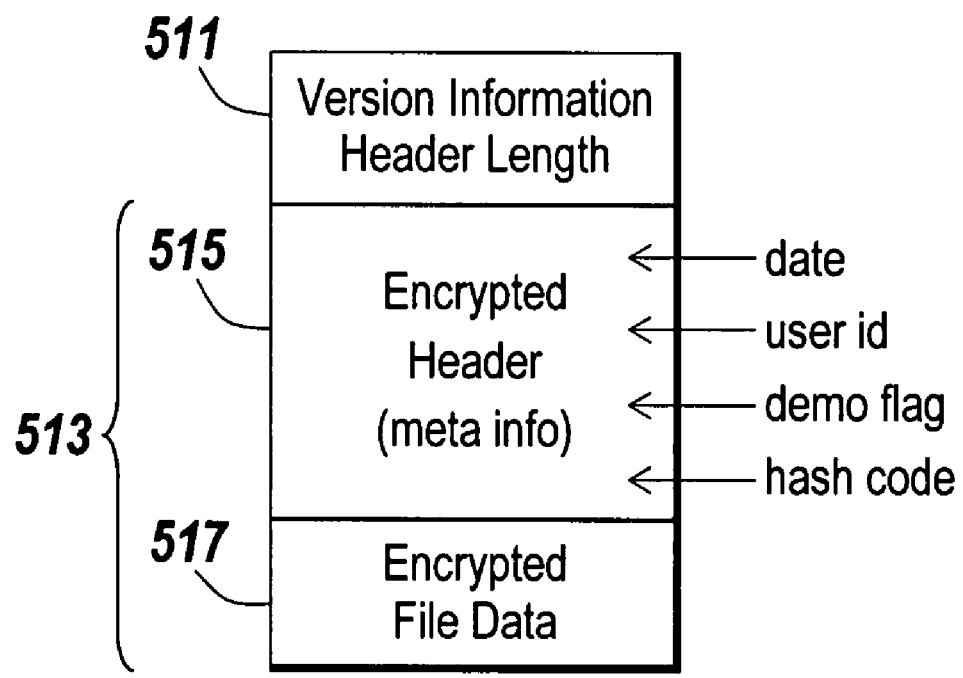
FIG. 5B is an exemplary format of the encrypted executable content in the archive depicted in FIG. 5A.

FIG. 5B is an exemplary format of the encrypted executable content 510 in the archive depicted in FIG. 5A. The encrypted executable content 510 primarily includes MATLAB® executable content files supplied by the application provider 110 as input files 310 and other MATLAB® executable content files on which the input MATLAB® executable content files 310 depend on. The encrypted executable content 511 may include non-encrypted data 511 and encrypted data 513. The non-encrypted data 511 may include tags for indicating the version of the archive 330 so that the application provider 110 can manage the version control of the application 130 according to the changes of the MATLAB® executable content files in the archive 330 or changes in the execution engine 113. The non-encrypted data 511 may also include header information of the MATLAB® executable content files that may contain information on a compression method, compressed and uncompressed sizes of the MATLAB® executable content files, etc. The header information may also include header lengths in bytes.

The encrypted data 513 may include encrypted meta-information 515 and encrypted file data 517 of the MATLAB® executable content files. The encrypted MATLAB® executable content file data 517 includes the MATLAB® executable content files compressed and encrypted with cryptographic keys generated in the wrapper file generator 420. The information on the compression method may be included in the header information of the MATLAB® executable content files in the archive 330. One of skill in the art will appreciate that various kinds of compression methods may be applied to compress and uncompress the MATLAB® executable content files, such as Huffman encoding, run length encoding, Discrete Cosine Transforms (DCT), etc. The illustrative embodiment of the present invention uses the Advanced Encryption Standard (AES) cryptosystem to encrypt the compressed MATLAB® executable content files in the archive 330. One of skill in the art will appreciate that the MATLAB® executable content files may be encrypted using other hybrid encryption standards, such as Data Encryption Standard (DES), or other types of encryption algorithms. The encrypted meta-information 515 may include a user identification of who compiled the application 130 to help track pirated software. The encrypted meta-information 515 may also include other information for the MATLAB® executable content files, such as user license data (demo flag), compilation date of the MATLAB® executable content files, and a hash code to ensure the data is not tampered with. The meta-information is encrypted with the same algorithm used to encrypt the file data 517. In the illustrative embodiment, a 1024-bit Rivest-Shamir-Adelman (RSA) key is used to protect the AES symmetric key. Each archive 330 is encrypted with a unique symmetric key. Per the AES standard, this symmetric key is then encrypted by a public key cryptosystem. One of ordinary skill in the art will appreciate that the meta-information may be encrypted using different types of public keys, such as an ECC (Elliptic Curve Cryptosystem) key, or different types of encryption algorithms. The decompression and decryption of the MATLAB® executable content files will be described below with reference to FIG. 9.

The non-encrypted executable content 530 may have a hardware platform-specific format, such as MATLAB® MEX files. If the application 130 makes use of MEX files, the application provider 110 may invoke the Compiler 111 with an option to add the MEX-files to the archive 330. Some MEX files may be discovered automatically by a dependency analyzer 410. The non-encrypted non-executable content 550 may also include native data files, such as MATLAB® data files (.mat) and text files (.txt). The application provider 110 may specify the names of the data files using the option to add the data files to the archive 330.

Figure 6:
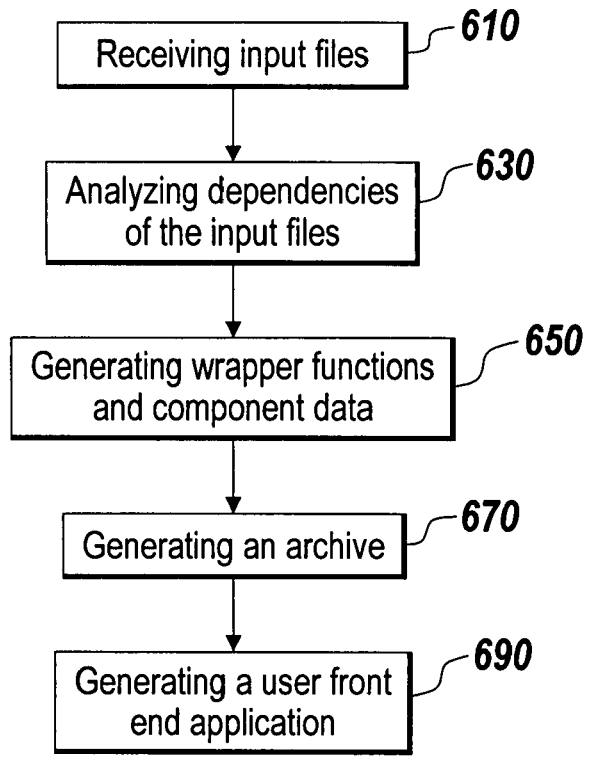
FIG. 6 is a flow chart illustrating an exemplary operation for generating the archive that contains files relating to the application.

FIG. 6 is a flow chart illustrating an exemplary operation for generating an archive 330 that contains related files to an application 130. The illustrative embodiment of the present invention uses Compiler 111 to generate the archive 330. The Compiler 111 receives input MATLAB® executable content files 310 relating to the application 130 (step 610). The Compiler 111 may receive MATLAB executable content files, such as M-files, MEX files, Java files, shared libraries, DLLs, etc. The application provider 110 may supply executable C/C++ content that is compiled into the user front end application 350. The Compiler 111 may also receive data files 315, which may be placed in the archive 330, without modification. The Compiler 111 also receives other data for generating the archive 330, such as user license data. The Compiler 111 analyzes the dependencies of the input MATLAB executable content files 310 and determines other MATLAB executable files on which the input MATLAB executable content files 310 depend (step 630). Compiler 111 generates a list of MATLAB executable files that includes the MATLAB executable content files on which the input MATLAB executable content files 310 depend. The Compiler 111 generates wrapper functions 460 based on the final executable type of the application 130, such as a stand-alone executable, a MATLAB® component and a shared library (step 650). The wrapper functions 460 may differ depending on the execution environment of the application user 150. The wrapper functions 460 contain a required interface between the MATLAB executable content files in the archive 330 and the executable type of the application 130. The Compiler 111 also generates component data that includes information needed for the MCR 113 to execute the MATLAB executable content files at run time (step 650). The component data is needed to initialize the MCR 113 in the electronic device 200 of the application user 150. The generated component data file contains the encrypted symmetric key and the Compiler 111's public key. The component data also includes path information of the MATLAB executable content files for the MCR 113 to load the MATLAB executable content files in the archive 330 as well as symmetric key needed to encrypt and decrypt the MATLAB executable content files in the archive 330. The list of MATLAB executable content files is used to create the archive 330 that contains the MATLAB executable content files needed to execute the application 130 at run time (step 670). Some of the MATLAB executable content files in the archive 330 are compressed and encrypted using the Advanced Encryption Standard (AES) cryptosystem in which the symmetric key are protected by a 1024-bit public/private key pair; each archive 330 is protected by a unique symmetric key generated by the Compiler 111. The archive 330 includes information on the directory structure of the MATLAB executable content files included in the archive 330 so that the MATLAB executable content files are installed and managed in the application user's electronic device as a single unit. The wrapper function 460 and component data are compiled into object code, which is linked with the necessary MATLAB® libraries and electronic device operating system libraries to create the user front end application 350 (step 690).

Figure 7:
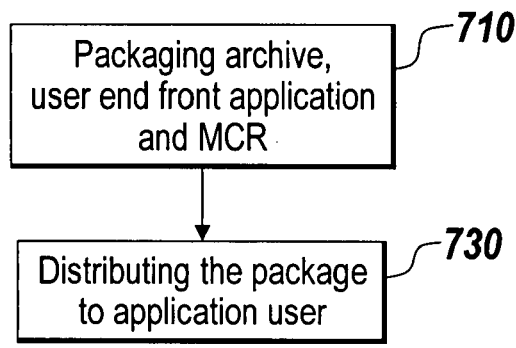
FIG. 7 is a flow chart illustrating an exemplary operation for packaging and distributing the archive to the application user.

FIG. 7 is a flow chart illustrating an exemplary operation for packaging and distributing an archive 330 to an application user 150. The application provider 110 may package the archive 330 with a user front end application 350 and the MCR 113 (step 710). The MCR 113 may not be packaged with the archive 330 and the user front end application 350 if the application user 150 already has the same MCR 113 installed in the electronic device 200 of the application user 150. The MCR 113 may need to be packaged together if the MCR 113 installed in the electronic device 200 of the application user 150 has a different version of the private key built into the MCR 113 or if the user has multiple versions of the MCR 113. The application provider 110 may also package a component installer for installing the archive 330 and the user front end application 350 in the electronic device 200 of the application user 150. The application provider 110 can deploy and distribute the package to the application user 150 (step 730). The application user 150 may download the package from the application provider 110 if the application user 150 has a network connection with the application provider 110. Otherwise, the package may be distributed in a computer-readable medium, such as CD-ROMs.

Figure 8:
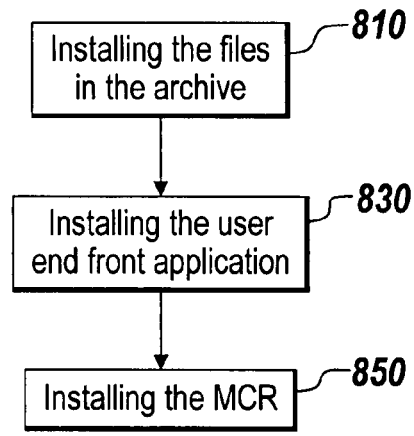
FIG. 8 is a flow chart illustrating an exemplary operation for installing the archive distributed to the application user.

FIG. 8 is a flow chart illustrating an exemplary operation for installing the files contained in an archive 330 that is distributed to an application user 150. On receiving the package illustrated above with reference to FIG. 7, the application user 150 may install the archive 330 using a component installer included in the package (step 810). The operating system specific files contained in the archive 330 are then made available to the operating system of the application user 150 so that the operating system of the application user 150 is able to execute the operating system specific files in the archive 330. In the illustrative embodiment of the present invention, this means making them available on the file system but one of skill in the art will appreciate this may not be necessary. The application user 150 may also install the user front end application 350 in the electronic device 200 of the application user 150 (step 830). The archive 330 and the user front end application 350 may be installed in a directory specified by the application user 150. The directory structure of the files in the archive 330 is maintained in the electronic device 200 of the application user 150. The application user 150 may further install the MCR 113 in a specified directory in the electronic device 200 of the application user 150 (step 850). The MCR 113 may be installed in a same or different directory than the archive 330 and the user front end application 350. One of skill in the art will appreciate that step 850 does not need to be performed after step 830 and may be performed before step 810. The MCR 113 is installed before the application is executed as described below with reference to FIG. 9.

Figure 9:
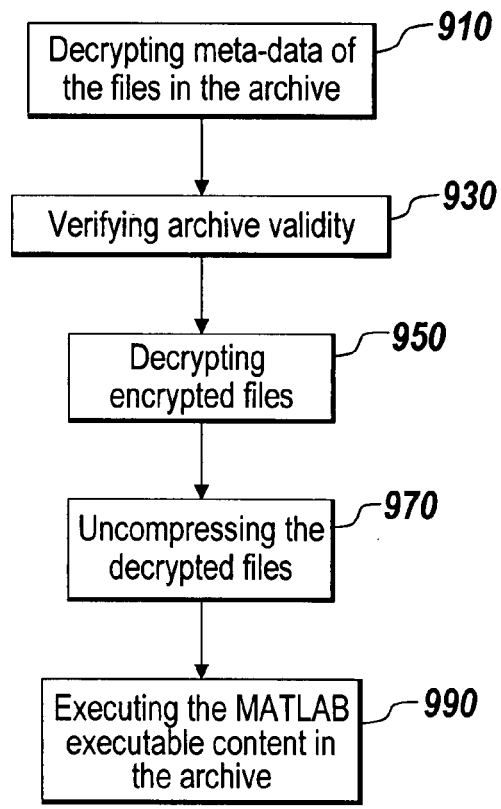
FIG. 9 is a flow chart illustrating an exemplary operation for executing the executable files in the archive.

FIG. 9 is a flow chart illustrating an exemplary operation for executing the archive 330 in the electronic device of the application user 150. The application user 150 may run the user front end application 350 to enable the MCR 113 to execute the application 130 in the environment of the application user 150. The MCR 113 installed in the electronic device 200 of the application user 150 decrypts the meta-data of the MATLAB® executable content files in the archive 330 using a private key built into the MCR 113 (step 910). The decrypted meta-data may include user license data and information enabling the MCR 113 to enforce an expiration date for applications generated by a compiler 111 operations under a demo or trial software license. The MCR 113 verifies the validity of the archive based on the symmetric key (step 930). This happens in a secure manner so that decrypted files are never available on shared memory, such as a computer disk. The MCR 113 also decrypts the MATLAB® executable content files using the decrypted symmetric key (step 950). The decrypted MATLAB® executable content file data is uncompressed (step 970) and executed by the MCR 113 in the electronic device 200 of the application user 150 (step 990). To initiate the execution of the application 130 automatically on clicking the archive 330 in the electronic device 200 of the application user 150, the extension of the archive 330 may be registered with the operating system of the application user 150. The archive 330 may include an operating system specific header on the front of the archive 330 which exposes functional entry points that redirect execution to the content of the archive 330. Thus, the archive 330 may appear to the operating system of the application user's electronic device to be an ordinary shared library or executable program.

In summary, the illustrative embodiment of the present invention provides a virtual file system for distributing an application to an application user and executing the application in the electronic device of the application user. One of skill in the art will appreciate that the application may be executed as any type of executable including stand alone executables, shared libraries and software components. Executable and other related files of the application are included in a composite file with a hierarchical directory structure of the files. One of skill in the art will appreciate that the composite file has a format that can include any type of files including executable and non-executable files. The composite file is deployed and distributed to the application user and installed in a specified directory in the electronic device of the application user while maintaining the directory structure of the files in the composite file. The executable files in the composite files are executed to run the application in the electronic device of the application user. Therefore, the application user can manage the application virtually as a single unit in the electronic device of the application user.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any application development tool that generates a distributable application. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method of creating a composite file, the method comprising:
    identifying content used by an application,
        the application having an executable type, and
        the content comprising at least one executable content file used by the application and one or more operating-system specific files to be executed by an operating system;
    creating a virtual file system in the composite file, the virtual file system including virtual files;
    storing the content in the virtual file system; and
    creating at least one entry point into the composite file permitting execution of at least one of the virtual files, the creating comprising:
        generating code for one or more wrapper functions, the generating:
            being performed based at least in part on the executable type of the application, and
            producing an interface between the executable content file and the executable type of the application; and
        generating component data that includes location information for the at least one executable content file used by the application and storing the component data with the composite file.

2. The method according to claim 1, further comprising an act of compressing at least one of the virtual files.

3. The method according to claim 1, further comprising an act of compressing the composite file.

4. The method according to claim 1, further comprising an act of creating a virtual file that includes at least one of the group comprising:
    a version of at least one of the virtual files;
    compression information of at least one of the virtual files;
    an encrypted hash of at least one of the virtual files;
    information of a user license under which the composite file was compiled; and
    a date of compilation of the composite file.

5. The method according to claim 1, further comprising an act of encrypting at least one of virtual files using an encryption key.

6. The method according to claim 5, further comprising an act of encrypting the encryption key.

7. The method according to claim 1, wherein the act of storing the content in the virtual file system includes an act of storing executable content in an executable virtual file that is stored at a storage location, and wherein the method further comprises an act of creating a virtual file that includes the storage location of the executable virtual file.

8. The method according to claim 1, wherein the act of storing the content in the virtual file system includes an act of storing executable content in an executable virtual file that is stored at a storage location, the executable virtual file capable of being executed on a plurality of platforms, and wherein the method further comprises an act of creating a virtual file that includes the storage location of the executable virtual file.

9. A non-transitory computer-readable medium having computer-readable instructions stored thereon that define instructions that, as a result of being executed by a computer, instruct the computer to perform the method of claim 1.

10. A non-transitory computer-readable medium having a data structure organized into a composite file, the composite file comprising:
    content used by an application, the application having an executable type and the content comprising at least one executable content file used by the application and one or more operating-system specific files to be executed by an operating system;
    a virtual file system;
    at least one virtual file stored at a storage location in the virtual file system; and
    at least one entry point redirecting execution to the at least one virtual file, the at least one entry point associated with:
        one or more wrapper functions that are generated, at least in part, based on the executable type of the application and include an interface between the executable content file and the executable type of the application, and component data that includes location information for the at least one executable content file used by the application.

11. The medium according to claim 10, wherein the at least one virtual file stores at least one of the group comprising:
content that is executable on a single platform;
content that is executable on a plurality of platforms; and
content that is not executable.

12. The medium according to claim 10, wherein the at least one virtual file includes:
an executable virtual file storing executable content; and
a virtual file including the storage location of the executable virtual file.

13. The medium according to claim 10, wherein the composite file further comprises a virtual file including at least one of the group comprising:
a version of the at least one virtual file;
compression information of the at least one virtual file;
an encrypted hash of at least one virtual file;
information of a user license under which the composite file was compiled; and
a date of compilation of the composite file.

14. The medium according to claim 10, wherein the at least one virtual file is encrypted.

15. The medium according to claim 14, wherein the composite file further comprises an encrypted encryption key.

16. The medium according to claim 10, wherein the at least one virtual files is compressed.

17. The medium according to claim 16, wherein the composite file is compressed.

18. A method of executing executable content comprising acts of:
instructing the operating system to execute a composite file, the composite file comprising:
content used by an application, the application having an executable type and the content comprising at least one executable content file used by the application,
one or more operating-system specific files to be executed by an operating system, and
component data that includes location information for the at least one executable content file used by the application;
redirecting execution to another software component using one or more wrapper functions, the wrapper functions generated, at least in part, based on the executable type of the application and including an interface between the executable content file and the executable type of the application; and
executing, through the software component, a virtual file stored in a virtual file system within the composite file.

19. The method according to claim 18, wherein the act of instructing includes an act of instructing, by a user, the operating system to execute a composite file.

20. The method according to claim 18, wherein the act of instructing includes an act of instructing the operating system to execute a front end application, the front end application instructing the operating system to execute the composite file.

21. The method according to claim 18, further comprising an acts of
decrypting the virtual file at run time; and
decompressing the virtual file at run time.

22. The method according to claim 18, wherein the act of redirecting execution comprises an act of validating the composite file was compiled under a user license allowing execution of the virtual file.

23. The method according to claim 18, wherein the act of redirecting execution comprises an act of validating an encrypted hash generated at compile time is identical to a hash generated at run time.

24. The method according to claim 18, wherein the act of redirecting execution comprises an act of validating a version of the virtual file is compatible with the software component.

25. The method according to claim 18, wherein the act of redirecting execution comprises an act of validating the software component is a non-MATLAB environment.

26. A non-transitory computer-readable medium having computer-readable instructions stored thereon that, as a result of being executed by a computer, instruct the computer to perform the method of claim 18.

27. An apparatus comprising:
a non-transitory storage medium for storing a composite file; and
a processor executing instructions for:
identifying content used by an application,
the application having an executable type, and
the content comprising at least one executable content file used by the application and one or more operating-system specific files to be executed by an operating system;
creating a virtual file system in the composite file, the virtual file system including virtual files;
storing the content in the virtual file system; and
creating at least one entry point into the composite file permitting execution of at least one of the virtual files, the creating comprising:
generating code for one or more wrapper functions, the generating:
being performed based at least in part on the executable type of the application, and
producing an interface between the executable content file and the executable type of the application; and
generating component data that includes location information for the at least one executable content file used by the application and storing the component data with the composite file.

28. The apparatus of claim 27 wherein the instructions are executable on a single platform and the virtual file includes a virtual file executable on a plurality of platforms.

* * * * *